United States Patent
Sutter et al.

(10) Patent No.: US 7,716,094 B1
(45) Date of Patent: May 11, 2010

(54) ESTIMATED TAX REMINDER AND PAYMENT FACILITATION SERVICE

(75) Inventors: David Sutter, Papillion, NE (US); Tod Kathol, Omaha, NE (US); Gordon Whitten, Omaha, NE (US); Carey Rademacher, Omaha, NE (US)

(73) Assignee: Intuit Inc., Mountain View, CA (US)

( * ) Notice: Subject to any disclaimer, the term of this patent is extended or adjusted under 35 U.S.C. 154(b) by 1039 days.

(21) Appl. No.: 11/123,475

(22) Filed: May 5, 2005

(51) Int. Cl.
*G06F 17/22* (2006.01)
*G07F 19/00* (2006.01)

(52) U.S. Cl. .......................................... 705/31; 705/30

(58) Field of Classification Search .................. None
See application file for complete search history.

(56) References Cited

U.S. PATENT DOCUMENTS

| | | | | |
|---|---|---|---|---|
| 6,360,208 | B1 * | 3/2002 | Ohanian et al. | 705/31 |
| 6,898,573 | B1 * | 5/2005 | Piehl | 705/31 |
| 7,188,083 | B2 * | 3/2007 | Agee et al. | 705/31 |
| 2001/0034769 | A1 * | 10/2001 | Rast | 709/206 |
| 2003/0040991 | A1 * | 2/2003 | Kapp | 705/31 |
| 2003/0061131 | A1 * | 3/2003 | Parkan, Jr. | 705/30 |
| 2004/0078307 | A1 * | 4/2004 | Carver | 705/31 |
| 2006/0095351 | A1 * | 5/2006 | Gershenfeld et al. | 705/35 |

FOREIGN PATENT DOCUMENTS

KR 2002/672441 A * 5/2002 ................. 705/31

OTHER PUBLICATIONS

Antenucci et al., "New tax laws impact on charitable activity", Arkansas Business & Economic Review, vol. 26 No. 3, p. 17, Fall 1993.*
Richardson, M., "Annual conference remarks of Margaret Milner Richardson . . . ", Tax Executive, vol. 46 No. 6, p. 466, Nov./Dec. 1994.*

* cited by examiner

*Primary Examiner*—F. Zeender
*Assistant Examiner*—Christopher Buchanan
(74) *Attorney, Agent, or Firm*—Osha • Liang LLP

(57) ABSTRACT

An estimated tax reminder system generates and sends reminders to taxpayers of their estimated tax obligations. The system determines the estimated tax obligation for a taxpayer and receives filing status information for the taxpayer reflecting whether or not a payment has been made for the taxpayer. In an embodiment, a computer program product accepts payment instructions for fulfilling estimated tax obligations and carries out the instructions.

19 Claims, 16 Drawing Sheets

1040-ES timator

You are logged in as: Bill Johnson, CPA

» PREVIOUS PAGE  John Black

| Payment Due Date | Quarter 1 03/15/04 | Quarter 2 06/15/04 | Quarter 3 09/15/04 | Quarter 4 01/15/05 | Extension 04/15/05 | Year to Date TOTAL |
|---|---|---|---|---|---|---|
| FEDERAL | | | | | | |
| Check No./ Confirmation No. | 1992 | 2002 | 2435 | 2650 | | |
| Date Paid | 05/10/04 | 06/14/04 | 09/14/04 | 01/14/04 | | |
| Advised Payment | $2,400 | $2,400 | $2,400 | $2,400 | | $9,600 |
| Amount Paid | $3,500 | $1,900 | $2,400 | $2,400 | | $9,600 |

SHOW VOUCHER »  [SHOW QTR. 1] [SHOW QTR. 2] [SHOW QTR. 3] [SHOW VTR. 4]

QUARTER: 1 2 3 4

FEDERAL VOUCHER | STATE VOUCHER

2004 Payment Voucher 4

1040-ES
Department of the Treasury
Internal Revenue Service

OMB No. 1545-0087

File only if you are making a payment of estimated tax by check or money order. Mail this voucher with your check or money order payable to the "United States Treasury." Write your social security number and "2004 Form 1040-ES" on your check or money order. Do not send cash. Enclose, but do not staple or attach, your payment with this voucher.

Calendar year—Due January 18, 2005

Amount of estimated tax you are paying by check or money order. — Dollars: $2,400  Cents: 00 — 410

| Your first name and initial | Your last name | Your social security number |
|---|---|---|
| John | Black | 485-15-1515 |

| If joint payment, complete for spouse Spouse's first name and initial | Spouse's last name | Spouse's social security number |
|---|---|---|
| Mandy | Black | 485-15-1515 |

Address (number, street, and apt. no.)
1234 Lakeside Drive

City, state, and ZIP code. (If a foreign address, enter city, province or state, postal code, and country.)
Hastings, NE 68081

[FILE VOUCHER] — 430

420

» I NEED HELP CALCULATING MY PAYMENT

| TAX CALENDAR | INCOME TAX | ESTIMATED TAX | PAYROLL TAX | SALES TAX | DEDUCTIONS |

1040-ES

» CLIENT LIST » MY ACCOUNT » LOGOUT

Intuit

You are logged in as: Bill Johnson, CPA

Quarter 4 Estimated Tax Clients and Payment Information

Refer to the chart below for details on your clients who pay quarterly estimated taxes. To add a client to the list, click the "Add New Client" button.

sort results by: [Show All ▾]

[ADD NEW CLIENT]

| ACCT NO. | CLIENT NAME / SSN | PHONE # | | ADVISED AMOUNT | ACTUAL AMOUNT | | | |
|---|---|---|---|---|---|---|---|---|
| SD4321 | John Black / 485-15-1515 | 515.555.1234 | ◁ | $2400.00 | $2400.00 (01/14/05) | EDIT | DELETE | SUMMARY |
| SD4356 | Jim Wonka / 485-66-2828 | 402.555.5555 | ▷ | $2400.00 | | EDIT | DELETE | SUMMARY |
| SD4321 | Marble Demar / 485-88-1111 | 612.555.9999 | | $2400.00 | | EDIT | DELETE | SUMMARY |

— 1010

🖂 GENERATE REPORT OF THESE RESULTS

— 1020

▷ Email Alert Sent
Email Alert NOT Sent
◁ Email Alert Opened

You are logged in as: John Black

« CLIENT LIST » MY ACCOUNT » LOGOUT

« PREVIOUS PAGE John Black

🖨 PRINT REPORT

FEDERAL

| Payment Due Date | Quarter 1 03/15/04 | Quarter 2 06/15/04 | Quarter 3 09/15/04 | Quarter 4 01/15/05 | Extension 04/15/05 | Year to Date TOTAL |
|---|---|---|---|---|---|---|
| Check No./ Confirmation No. | 1892 | 2002 | 2435 | 2650 | | |
| Date Paid | 05/10/04 | 06/14/04 | 09/14/04 | 01/14/04 | | |
| Advised Payment | $2,400 | $2,400 | $2,400 | $2,400 | | $9,600 |
| Amount Paid | $3,500 | $1,900 | $2,400 | $2,400 | | $9,600 |

SHOW VOUCHER »   [SHOW QTR. 1]   [SHOW QTR. 2]   [SHOW QTR. 3]   [SHOW QTR. 4]

NEBRASKA

| Payment Due Date | Quarter 1 03/15/04 | Quarter 2 06/15/04 | Quarter 3 09/15/04 | Quarter 4 01/15/05 | Extension 04/15/05 | Year to Date TOTAL |
|---|---|---|---|---|---|---|
| Check No./ | 1892 | 2002 | 2435 | 2650 | | |
| Date Paid | 05/10/04 | 06/14/04 | 09/14/04 | 01/14/04 | | |
| Advised Payment | $500 | $500 | $500 | $500 | | $2,000 |
| Amount Paid | $500 | $500 | $500 | $500 | | $2,000 |

SHOW VOUCHER »   [SHOW QTR. 1]   [SHOW QTR. 2]   [SHOW QTR. 3]   [SHOW QTR. 4]

ESTIMATED TAX REMINDER AND PAYMENT FACILITATION SERVICE

FIELD OF THE INVENTION

This invention pertains in general to tax preparation software, and in particular, to ways of automating the management of quarterly tax obligations.

BACKGROUND OF INVENTION

A significant number of small business owners, investors, and taxpayers with supplemental income are responsible for making quarterly estimated tax payments to federal and state taxing authorities. Under conventional methods, meeting this obligation requires a taxpayer to remember to make payments according to the schedule set by the taxing authorities as well keep track of the amounts due on a quarterly basis.

If the taxpayer uses a professional tax preparer or certified public accountant (CPA), typically the taxpayer will be provided a supply of pre-printed payment slips or vouchers to be submitted with a payment at appropriate times. Adjustments due to fluctuations in income or other factors must be calculated manually, typically by the taxpayer himself. Generally, the CPA does not keep track of whether and when payments are made by the taxpayer, the amount that was paid out, or details relevant to future payments. The lack of information makes it harder for professional tax preparers to follow up on delinquent taxpayers, and to prepare subsequent tax returns.

The IRS has introduced the Electronic Federal Tax Payment System (EFTPS), a mechanism by which taxpayers can make tax payments through an electronic interface. This is only a payment mechanism, like many other online billing and payment services. Most significantly, it cannot and does not proactively prompt a user for payments nor does it provide historical or estimated tax values. Furthermore there are limited means by which a taxpayer's tax and payment history can be tracked.

What is needed, therefore, are ways to automate and improve the management of quarterly tax obligations.

OVERVIEW OF INVENTION

Embodiments of the invention ease the burdens associated with filing quarterly taxes by generating and transmitting to the taxpayer a reminder of a quarterly tax obligation of the taxpayer based on information about the taxpayer, along with an estimated periodic tax payment thereby allowing the taxpayer to make the correct payment. The reminder received by the taxpayer includes a pointer to an online payment system interface for receiving a payment instruction from the taxpayer for submitting a payment to a taxing authority. The pointer, in turn, can comprise a link to a website operated by a payment agent associated with a taxing authority.

A tax professional or other user can use the present invention to send reminders of upcoming tax deadlines to any number of her taxpayer clients. One embodiment of the present invention is a computer program product executable on a user's computer system. For each of the user's clients, the product generates and transmits a payment reminder of an upcoming estimated tax payment obligation. The product receives payment status information for each client reflecting whether or not a tax payment has been made and provides an output to the user that includes the status information. In one embodiment, the product generates a tracking interface with which the user can provide an instruction to take an action based on the filing status of a taxpayer client.

BRIEF DESCRIPTION OF INVENTION

FIG. 4 depicts a screen for viewing and editing estimated tax payment obligation information.

FIG. 5 depicts a tax estimator worksheet generated by a tax calculation module of an estimated tax reminder system.

FIGS. 7A and 7B depict screenshots of interfaces integrated into various tax preparation applications for enlisting taxpayers to receive reminders from an estimated tax reminder system.

FIG. 10 depicts a screenshot of a webpage generated by an estimated tax reminder system for viewing filing status and other information for the clients of a tax preparer.

FIG. 11 depicts a screenshot of a webpage generated by an estimated tax reminder system for viewing filing status and payment history information for an individual taxpayer.

DETAILED DESCRIPTION OF INVENTION

Estimated Tax Reminder System

Figure 1:
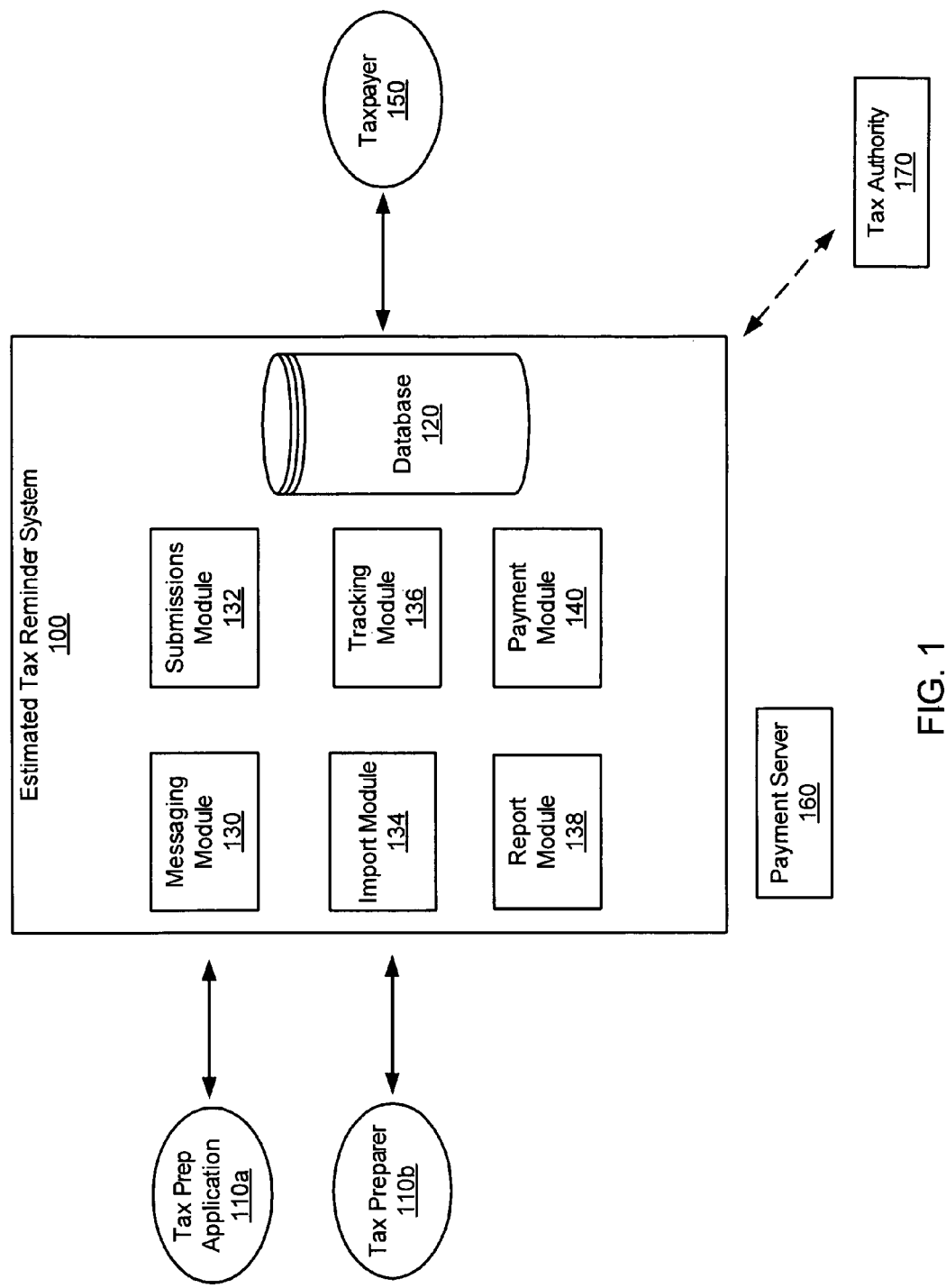
FIG. 1 depicts a block diagram of an estimated tax reminder system.

FIG. 1 depicts a block diagram of an estimated tax reminder system 100. The estimated tax reminder system 100 receives tax information about one or more taxpayers 150 from various sources 110 or directly from the taxpayers 150. The tax information is stored in a database 120 along with contact information for each taxpayer. On a periodic basis, the estimated tax reminder system 100 generates a reminder of the quarterly tax obligation for a number of the taxpayers based on the tax information for each taxpayer and transmits the reminders to those taxpayers. Through any of a variety of methods, a taxpayer can use the reminder to make a payment to the taxing authority 170 in fulfillment of the tax obligation. The system 100 relieves taxpayers of the burden of keeping track of the amount of the quarterly obligation and the dates by which payments need to be made and facilitates the payment process. Taxpayers, tax preparers 110b, or other users can use the estimated tax reminder system 100 to specify a schedule of reminders and payments to fit the custom profile of a taxpayer.

The estimated tax reminder system 100 uses tax information to determine one or more periodic tax obligations for taxpayers 150. The tax obligations may be imposed by one or a combination of federal, state, local and/or other taxing authorities, on a bi-annual, quarterly, or more frequent basis and may reflect income, payroll, or other types of tax payments. As used throughout this disclosure, the terms "taxpayer", "taxpayer client", "client", and "client taxpayer" are used interchangeably to refer to any combination of individual, business, or other organization that has a periodic tax obligation. Taxpayers 150 may use professional tax preparers 110b such as a certified public accountants (CPA), tax preparation applications 110a, or other software applications or aids to help manage and meet the taxpayer's quarterly obligations. A "user" such as a taxpayer 150, tax preparer 110b, or other party involved in administering a taxpayer's 150 tax obligations, can set up the estimated tax reminder system 100 to provide reminders to the taxpayer 150 based on information provided to it.

A user may access the estimated tax reminder system 100 through any of a variety of electronic systems including a computer, laptop, handheld, cell phone, or other networked device. In an embodiment, interfaces generated by the estimated tax reminder system 100 are accessed through HTML pages served over a network connection that can be accessed through the internet, or another network and rendered by the user's browser. The term "network connection" may refer to any connection or combination of connections supported by a digital, analog, satellite, wired, wireless, local or wide area networks. In some cases, a network connection may be supplied by a conventional phone line, for instance, used by the estimated tax reminder system 100 to send a phone reminder of a payment obligation. Conventional or emerging phone automation technologies such as voice recognition or touch-tone detection may be used with the line.

The estimated tax reminder system 100 can comprise a standalone computer product or software application to provide the reminder service that uses information generated by an existing financial tax preparation application 110a, generic financial software, or tax preparer 110b. Or, it can be integrated into a desktop or server-based tax preparation, tax management or general financial software application. For example, the estimated tax reminder system 100 could be provided as a component of a suite of financial products that enable users to file their estimated taxes on a quarterly basis. Then payment information can then be used to carry out year-end tax reporting, based on the difference between what has been paid out in estimated tax payments by a taxpayer 150 and the taxpayer's actual tax burden. In an embodiment, the estimated tax reminder system 100 comprises a desktop application used exclusively by the taxpayer 150 from the taxpayer's computer or device. In another, the estimated tax reminder system 100 comprises a server-based application that a user can access over a network from her PC, laptop, or other electronic device.

The system 100 of FIG. 1 includes a database 120 for storing tax and other information about various taxpayers 150. The database 120 comprises a repository of records corresponding to individual taxpayers 150 that could take the form of any of a variety of conventional data structures including a relational database management system or a flat file system. Information provided by a user about each taxpayer 150 can be stored in the database 120, including the taxpayer's contact information to allow the system to electronically transmit the reminder to the taxpayer, including email address, instant message handle, facsimile number, phone number, as well as tax data (e.g., current income and deductions) from which an estimated tax obligation can be determined. This tax data could comprise estimated obligations already calculated, for instance, by a tax preparation application 110b or tax preparer 110b. The tax data may also include previous year or current tax year financial data about the taxpayer—for instance income, deduction, exemption, tax rate, and other information—and may also include assumptions about an estimated increase or decrease in any value from a previous year. The database 120 can also store tax tables, tax rates, tax rules, and other tax rate information used to calculate a tax payment. Using the information described above, an estimated tax reminder system 100 could calculate an initial obligation, for instance. As described in more detail below, the additional information may be provided to allow this initial estimate to be recalibrated with the new information. The database 120 can also store payment history and other tracking and status information as described in more detail below.

The database 120 may also contain instructions and preferences from taxpayers 150, tax preparers 110b or other users regarding reminders—including the taxpayer's preferred method of contact (e.g., email), how often (e.g. weekly for three weeks prior to the tax payment due date) and when reminders should be provided, and the methods by which taxpayers 150 can specify that payments are provided to taxing authorities 170. It also may contain administrative information to be used for different taxpayers 150 such as messaging templates for the reminders and scripts, and protocol and information about various payment servers 160. The information stored in the database 120 can be provided over a network connection by the user through a graphical user interface, uploaded, or otherwise supplied to the database 120. The database 120 may also include contact and other information for a tax preparer, as well as the tax preparer's instructions or preferences concerning reminders and interfaces to be shown to the tax preparer's clients.

The estimated tax reminder system 100 includes a messaging module 130 and submissions module 132 for carrying out various reminder and payment submission functions. As used herein, the term "module" can refer to computer program logic for providing the specified functionality. A module can be implemented in hardware, firmware, and/or software. The messaging module generates reminders for taxpayers 150 reminding them of their obligations to pay estimated taxes as well as other communications functions. The reminders are generated, addressed, and sent based on contact and preference information stored in the database 120. The reminders may be based on templates specific to a tax preparer 110b associated with a particular taxpayer 150 and may include personal contact information for a tax preparer 110b or other sources of assistance available to the taxpayer 150. The reminders can comprise electronically generated messages that are intended to facilitate payment by the taxpayer. For instance, a reminder may include a pointer to an online billing system interface for receiving a payment instruction from the taxpayer. Clicking on the pointer would bring the taxpayer 150 to a website operated by an agent of a taxing authority 170 that allows for direct payment to a payment server 160 associated with the taxing authority 170. Alternatively, accessing the pointer may launch a desktop application that prompts the user for payment instructions and as per the taxpayer's 150 instruction, provides the information on behalf of the taxpayer 150 to a secure payment server 160 for meeting the taxpayer's estimated tax obligation. Following a protocol specified by a user, a series of messages can be sent, depending on how responsive the taxpayer is. For instance, an initial email reminder may be followed up with an automatically generated voicemail message or letter correspondence.

In the case of a message transmitted to the taxpayer's 150 telephone, the system 100 can include a standard autodialer system (not shown) including voice generation, dialing, and/or messaging capabilities to correspond with the taxpayer 150. A phone message may be created using a prerecorded message template, synthesized using voice generation software based on a predetermined text script, or be based on a live recording provided by a user, call center representative, or other party. The autodialer system may in turn transmit the message over a telephone connection leaving a message if the taxpayer 150 is not the telephone number. A message, for instance, asking whether or not a user has fulfilled their tax obligation, may solicit a touch-tone response that is detected and recorded by the messaging module 130, or a verbal response that is recorded.

The estimated tax reminder system 100 includes a submissions module 132 that is used to determine the estimated tax obligation of one or more taxpayers 150. The submissions module 132 calculates a taxpayer's tax obligation based on the taxpayer's tax data including, for instance, the taxpayer's previous or current tax year income, and taxing tables or rates provided from one or more taxing authorities 170. The submissions module 132 can provide the estimate to the taxpayer 150 in any of a variety of forms. The estimate may be provided to the messaging module 130 and then included in a reminder, for instance. Or the estimate may be stored in the database 120 and then provided to the taxpayer 150 as part of an interface for soliciting payment to the taxing authority 170.

The submissions module 132 also receives information about payments made or payment instructions provided. This information can be provided from various sources. For instance, it can be generated by the estimated tax reminder system 100, when payments are provided to one or more taxing authorities 170 through the estimated tax reminder system 100, or when payment instructions are received and then performed by the estimated tax reminder system 100. Alternatively, a client 150 may make a payment directly to the taxing authority 170 and then report this information to the estimated tax reminder system 100. A tax preparer 110b can then use the estimated tax reminder system 100 to access this information and take appropriate follow up action.

Figure 9A:
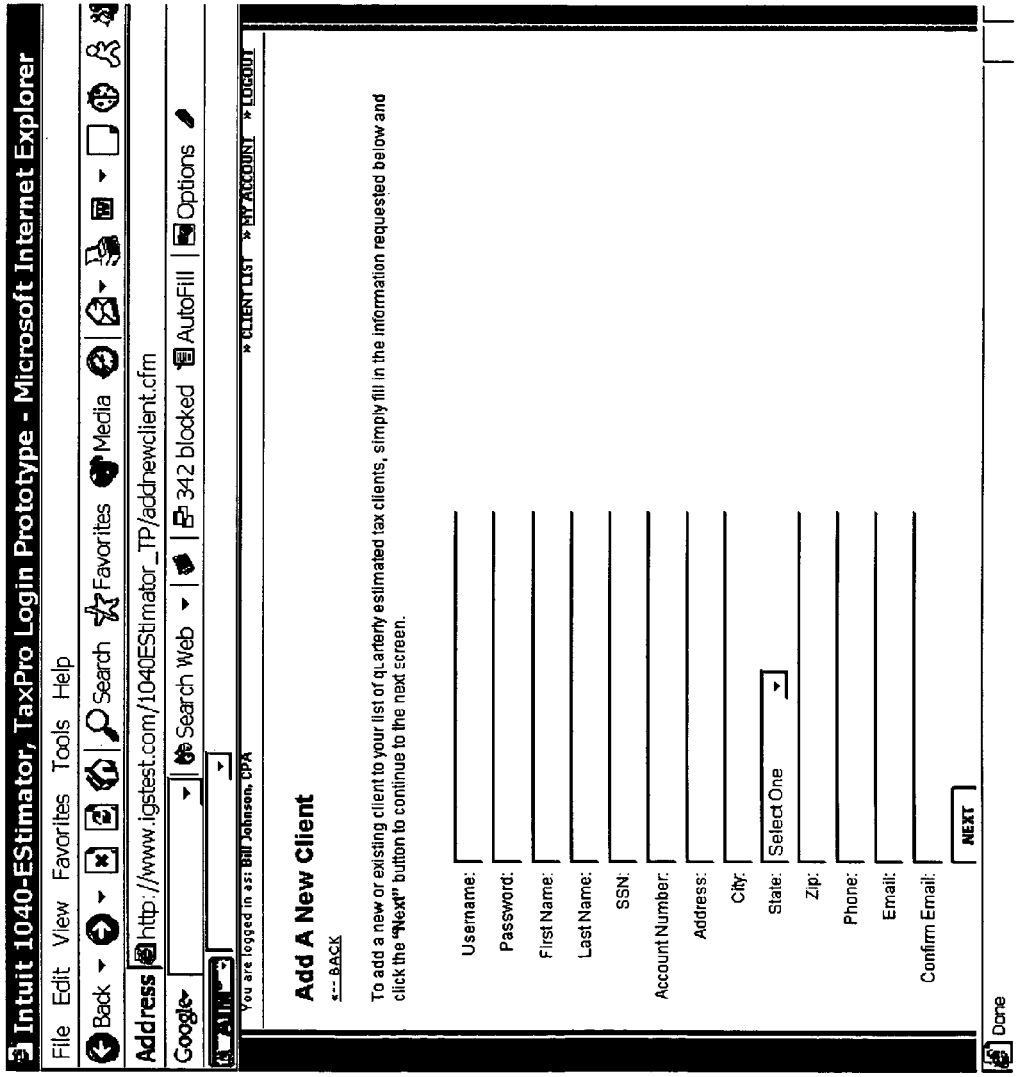
FIGS. 9A and 9B depict screenshots of webpages for adding a clients and client information to an estimated tax reminder system.
Figure 9B:
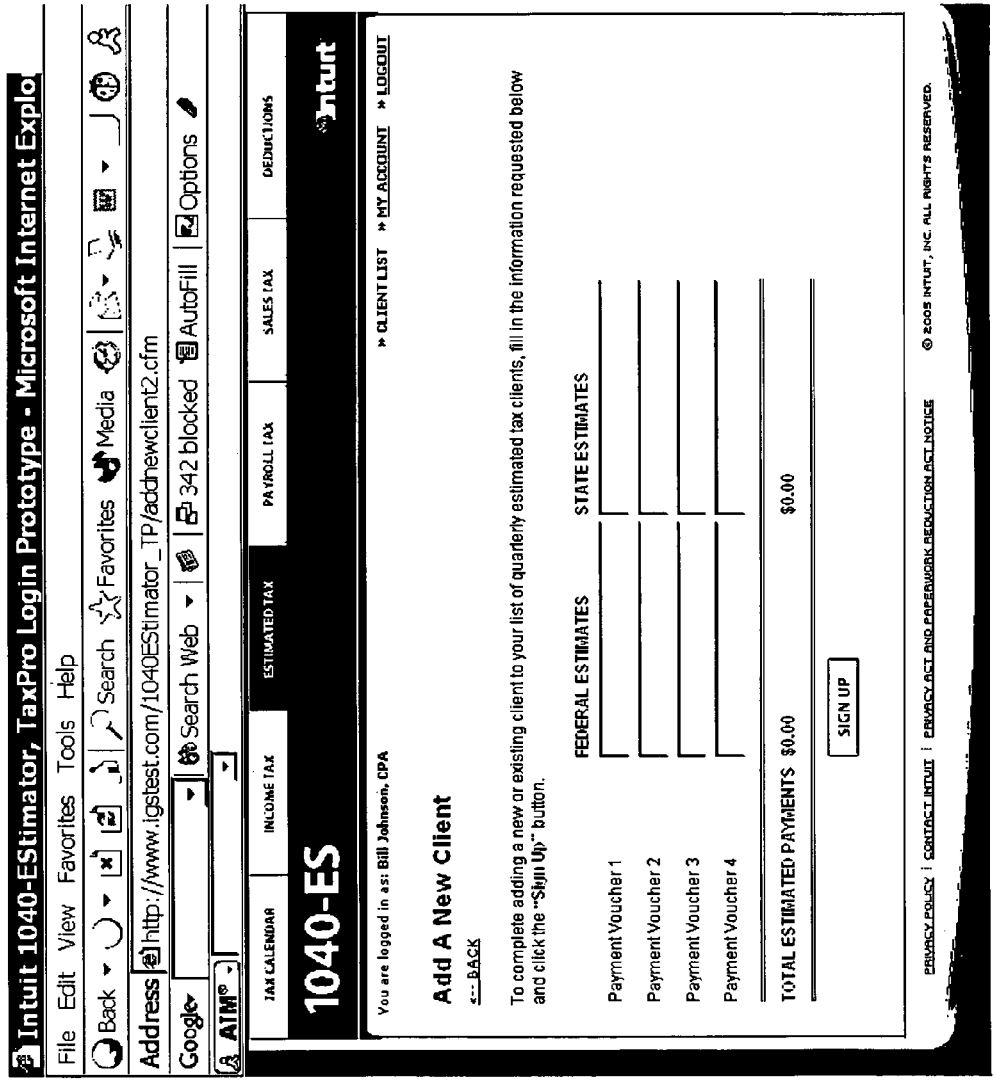

The system 100 of FIG. 1 includes various other modules 134-140 for carrying out assorted estimated tax related functions. An import module 134 receives taxpayer information and tax data from any of a variety of sources. For instance, the import module 134 can receive one or more electronic tax return or financial files generated by a software application, such as a tax preparation application 110a. The application 110a may comprise a desktop or server-based application. Relevant tax information such as the taxpayer's previous year tax obligation may be extracted from the file, using a parser for instance, to be stored in the database 120 and used by the estimated tax reminder system 100. In an embodiment, the estimated tax reminder system 100 is integrated into a tax preparation application 110a and the information is stored in a database 120 commonly used by both the tax preparation application 110a and estimated tax reminder system 100. Relevant information is then retrieved from the database 120 as needed. Information can also be provided to the import module 134 through a website interface, by a taxpayer 150 or tax preparer 110b. Using any of these or other conventional methods, tax information for more than one taxpayer at a time can be uploaded to the import module 134. For instance, in an embodiment, a tax preparer 110b can provided a spreadsheet that includes values for all of the preparer's 110b tax clients. Various websites for receiving this information are described with reference to FIG. 9 below. An enrollment module (not shown) can be used to enroll a customer in an electronic tax payment system of a tax authority 170, for instance, where such pre-enrollment is required in order for the user to make electronic payments. For example, the EFTPS requires a taxpayer to submit a social security number, name, address, and banking information to make certain types of payments. The enrollment module of the estimated tax reminder system 100 retrieves this information from the database 120 or, where not available, may include an interface for soliciting it from the taxpayer. The module is in communication with the tax authority 170 and enrolls the taxpayer without any additional involvement from the taxpayer.

The system 100 also includes a tracking module 136 for tracking progress made towards fulfillment of a taxpayer's quarterly estimated tax obligation. The tracking module 136 can store any type of tracking information in the database 120, reflecting for instance payment status and history, the status of communications with the taxpayer 150, and confirmations or other information provided from the taxing authority 170 to the taxpayer. Payment status information may reflect, for instance, whether or not payment instructions have been provided to the estimated tax reminder system 100, whether or not a payment has been submitted to satisfy an estimated tax obligation, to what authorities 170 payments have been made, and the amounts of payments made. The tracking module 136 can also track communications between the taxpayer 150 and estimated tax reminder system 100— including when a reminder is transmitted successfully to the taxpayer, and whether it has been read by the taxpayer, and whether or not a taxpayer has accessed a website referenced by an email reminder in order to make a payment. The tracking module 136 may also keep track of communication from a taxing authority for instance a message confirming receipt of a payment, or communicating that an error has occurred, or that an estimate needs to be revised. Various information captured by the tracking module is described with reference to FIG. 10 below.

A report module 138 generates a report based on information about one or more taxpayers 150 stored in database 120. This report may be provided to a tax preparer 110b, taxpayer 150, or other user seeking information, for instance about the taxpayer 150 or payment choices made. The report may also be provided to a tax preparation application 110a. For instance, the report module 138 can prepare a report that includes information about what estimated taxes have been paid throughout the year to be used by the tax preparation application 110a to prepare a year-end tax return. The difference between the estimated and calculated taxes can be then provided to or claimed from the taxing authority 170. As another example, the report module 138 can provide payment information to a financial application that tracks the taxpayer's revenues and expenses. Various outputs generated by the report module are described with reference to FIGS. 12A and 12B below. Also included in the system 100 is a payment module 140 for carrying out the payment instruction. The payment module 140 is capable of receiving and executing various payment instructions on behalf of a taxpayer 150. The instructions may specify a method of payment, a date for payment, or a series of installment payments to be made to satisfy a tax obligation. Various functions performed by the payment module are described in greater detail with reference to FIGS. 4-6 below.

In the system 100 shown in FIG. 1, a database 120 and various system modules 130-150 are all housed together, whereas a tax preparation application 110a is provided separately. However, it is not necessary for the elements to be housed as shown; the elements can be hosted by other entities or in some cases may even stand-alone. In some implementations of the system, the various elements may also appear in different configurations. Furthermore, it is not necessary for every embodiment of the invention to include all of the elements depicted. Likewise, as other elements and sub-elements are described throughout the invention, it should be understood that various embodiments of the invention may exclude elements and sub-elements described, that the elements and sub-elements may be hosted in configurations other than those shown, and that elements and sub-elements, even within an element, may be hosted in different locations or by different entities than those shown.

Estimated Tax Reminder System—Taxpayer View

Figure 2:
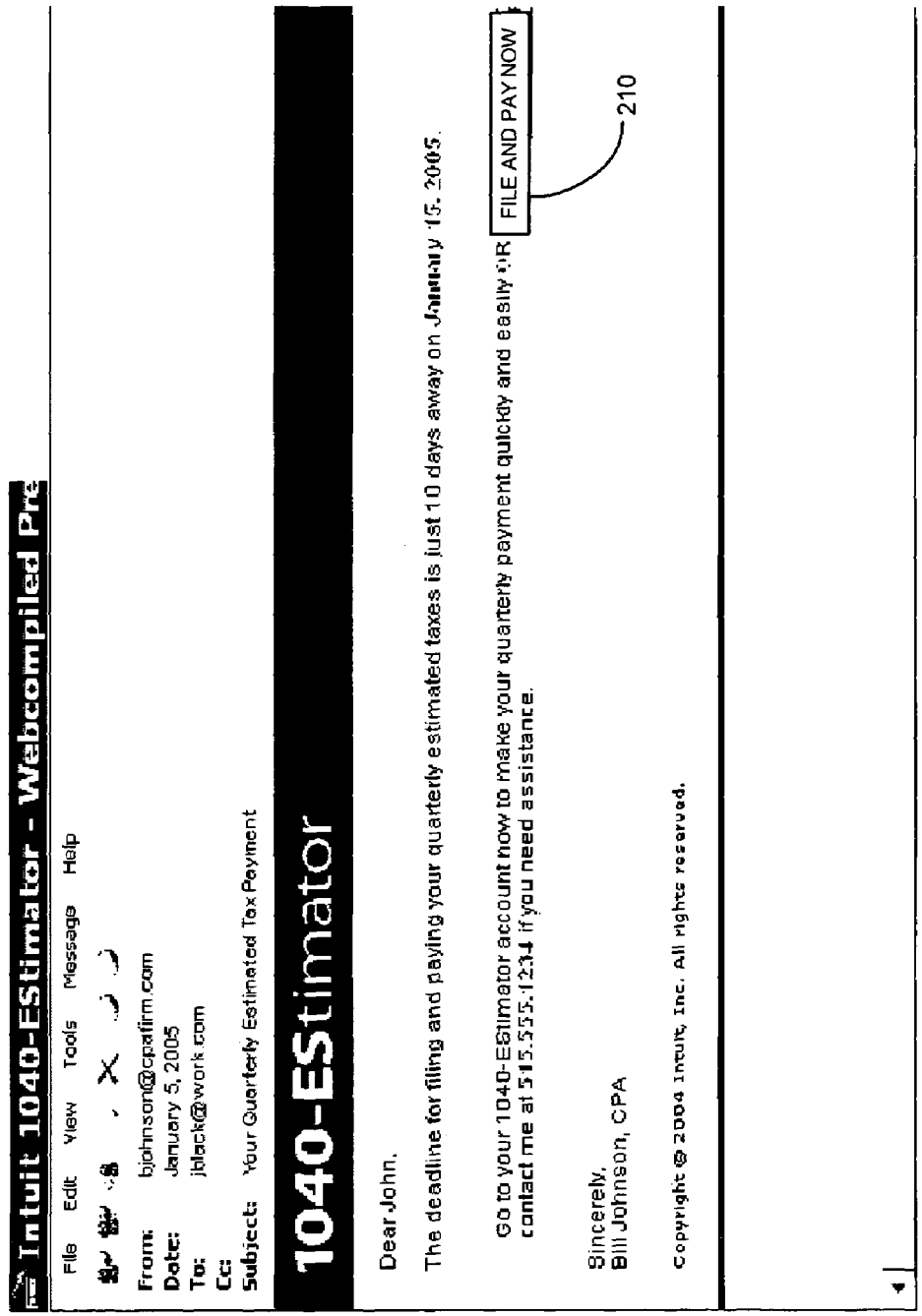
FIG. 2 depicts an email reminder generated by an estimated tax reminder system.

FIG. 2 depicts an email reminder generated by the messaging module 130 of an estimated tax reminder system 100. The email reminds the taxpayer, John Black, that the deadline for filing quarterly taxes is 10 days away. Such an email may be generated on a quarterly or other periodic basis, and may be sent on a timetable set by a tax preparer or other user. A tax preparer could indicate, for instance, that a message be sent at least 10 or 15 days before federal, state, local, or other deadlines, and be sent on a weekday. As shown, the reminder is addressed from the tax preparer, Bill Johnson CPA, so that the taxpayer can easily reply to the tax preparer. Included also is the tax preparer's phone number, retrieved from the database 120.

The reminder is addressed to the taxpayer using email contact information stored in the database 120. However, one of skill in the art will recognize that such a reminder could also be sent in the form of an instant message, calendaring appointment in an email application, or other electronic communication. The message includes a pointer 210 that may point to, in an embodiment, an interface including a series of web pages that the taxpayer can use to determine or view an estimated tax obligation, and provide a payment accordingly. Alternatively, the pointer 210 may comprise a link to a website operated by an agent associated with the taxing authority, such as the EFTPS. In one embodiment, the reminder includes minimal information about the taxpayer (so as to not disclose otherwise confidential information), instead instructing the taxpayer to visit a website where the taxpayer can securely access details about his estimated payment. However, in another embodiment, the reminder includes an actual payment estimate and an electronic voucher pre-populated with the taxpayer's information including the payment estimate. The taxpayer can edit the voucher and print it out and use that to submit her tax information directly to the taxing authority. The reminder could also include a link to an estimated tax calculator that automatically pulls personal and tax/financial information from the database 120 from which the taxpayer's estimated tax obligation can be calculated, and provides it through a graphical interface to the taxpayer. The taxpayer can make adjustments and/or additions to the information provided in the interface, before using the calculator to determine her estimated tax obligation.

Figure 3A:
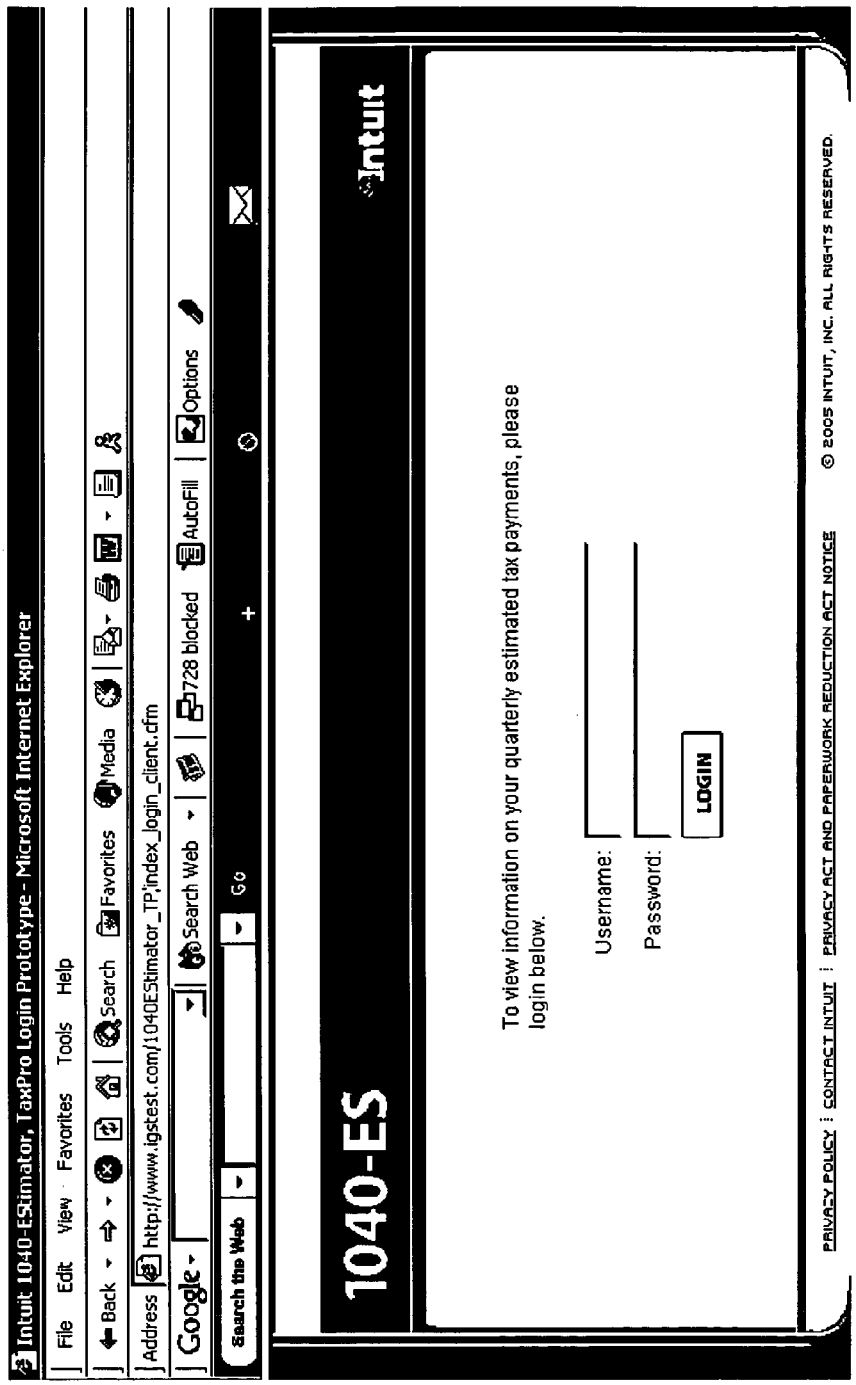
FIGS. 3A and 3B depict sign-on screens that can be used by a taxpayer to login to interfaces for managing quarterly estimated tax obligations.
Figure 3B:
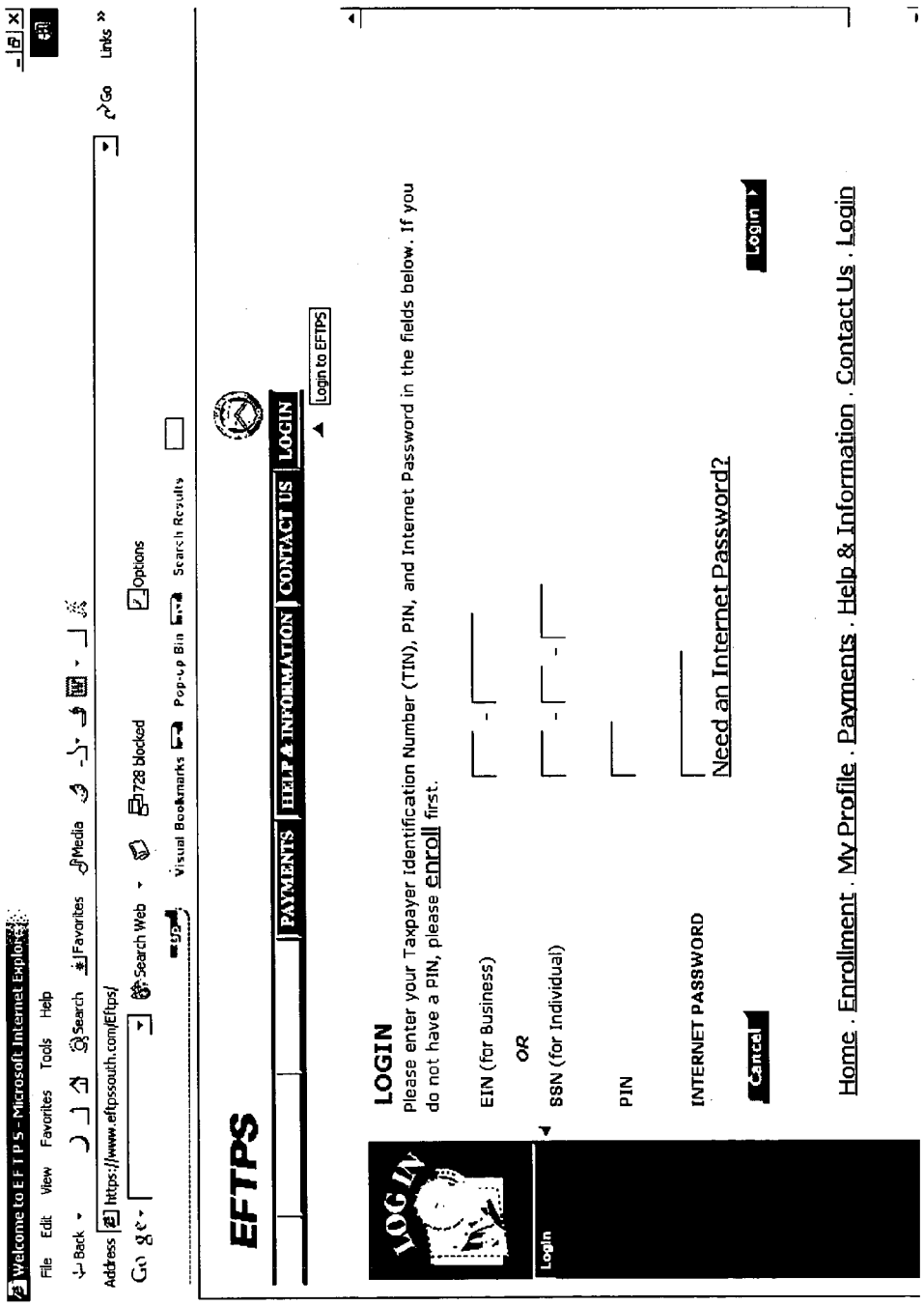

In one embodiment, the pointer provided in the reminder email of FIG. 2 leads the taxpayer to a sign-on screen. FIG. 3A depicts a secure sign-on screen a taxpayer can use to authenticate his identity and sign onto an estimated tax reminder system. FIG. 3B similarly shows a login screen for the Electronic Federal Tax Payment System, a website for providing a payment to the federal government. Signing onto an estimated tax reminder system, a taxpayer can use the webpage depicted in FIG. 4 to view his tax payment obligation information. The webpage includes an editable voucher form pre-populated with the taxpayer's data including information identifying the taxpayer and an estimated tax amount for the taxpayer 410. Although FIG. 4 shows an image of a federal tax voucher, a voucher for state or local taxes could also be provided. A submissions module of the system creates the voucher based on taxpayer information stored in the database, and determines the estimate shown in the estimated tax field 410 using any of a variety of methods. The submissions module can use an estimate provided by the tax preparer 110b or the tax preparation application 110A, for instance. Or, it can apply tax rules of a taxing authority to income information or estimates provided by the taxpayer or other use. Such application may reflect a taxpayer's preferences, for instance to pay 10% above the previous year's taxes in order to take advantage of the federal safe harbor for revenue increases. In an embodiment, the tax professional can use the estimated tax reminder system 100 to prepare and check the taxpayer's voucher before it is made available to the taxpayer. When the taxpayer logs on to the system 100, the taxpayer can edit or update the information in the voucher. The voucher is then available for printing out or electronic submission to the taxing authority.

Figure 5:
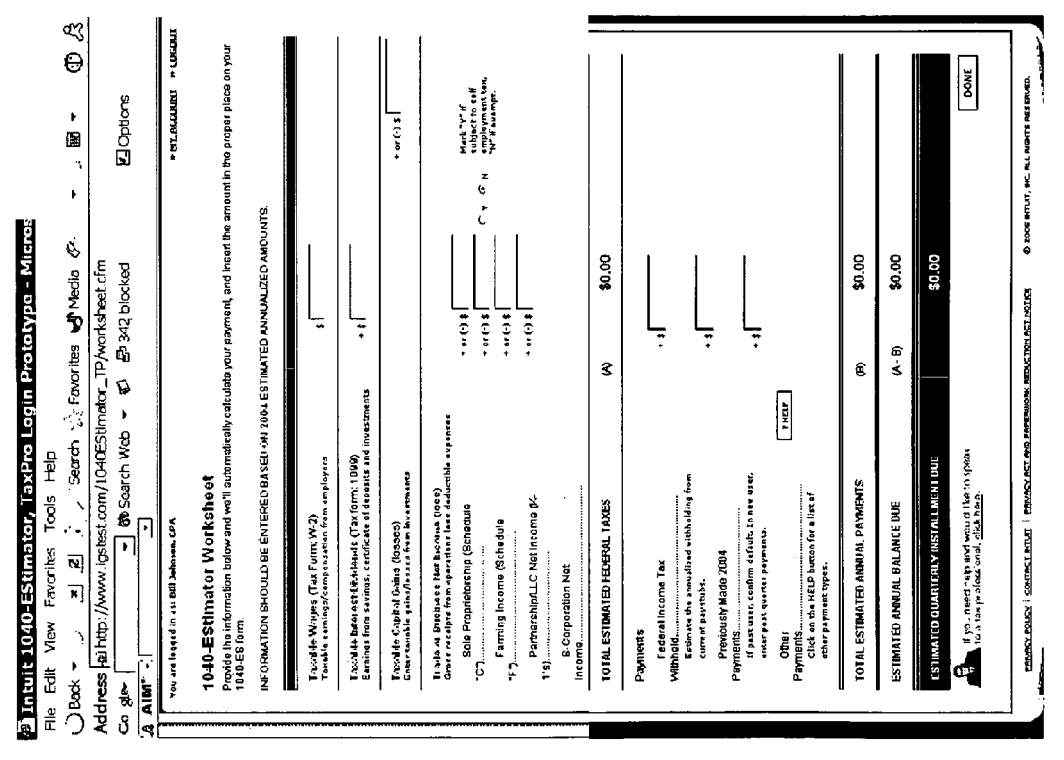

If the taxpayer wants to calculate or check his estimated tax obligation, he can click on the link 420 shown at the bottom of the webpage. The link 420 leads to an interface for calculating the taxpayer's tax obligation such as the tax estimator worksheet shown in FIG. 5. In an embodiment, the taxpayer provides requested current or previous year information through the worksheet as shown, which is used by a tax calculation module of an estimated tax reminder system 100 to determine the taxpayer's tax obligation. In another embodiment, the tax calculation module retrieves relevant financial, tax and/or personal information from the database 120 and populates the worksheet with the default information. The taxpayer can then edit or modify the information provided in the worksheet before using the tax calculator to determine the appropriate estimated tax obligation. The calculated estimate can then be automatically inserted in the appropriate portion of a tax voucher. If the obligation can be calculated using alternative methods such as by adding 10% to the previous year's obligation, or by calculating it based on actual or estimated revenues or financial amounts, in an embodiment, the tax calculation module uses the methods to determine various number of estimates, and according to the instruction of the taxpayer, uses the selected estimate. In addition, for taxpayers who have failed to file on time, the tax calculation module can include estimated penalty information in any estimate based on the amount of time past the deadline. A link to communicate with a tax professional—through an email, internet chat, or other messaging medium for instance—is provided at the bottom of the page 430 if the use has questions about the calculated estimate. Although an estimator worksheet is shown in FIG. 5, a wizard, questionnaire, or other type of interface can also be used.

Figure 6:
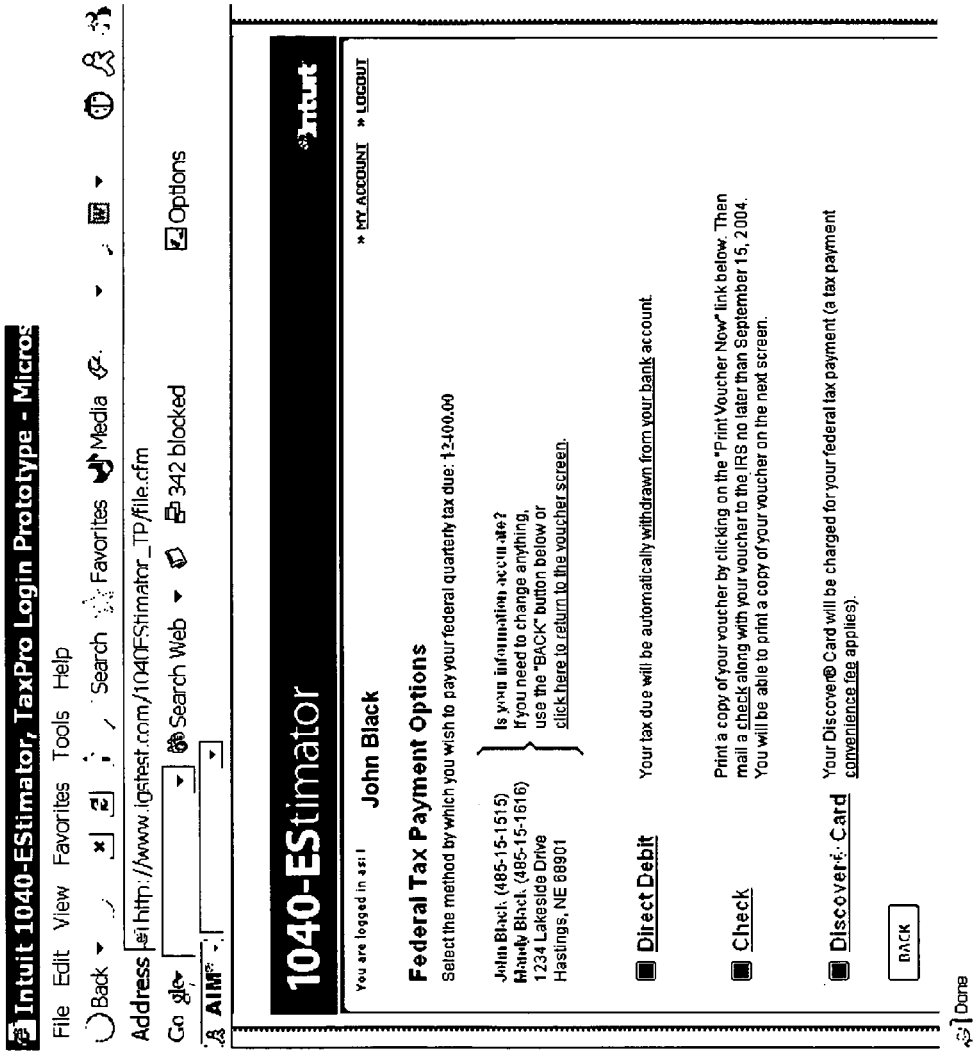
FIG. 6 depicts a screenshot of a webpage generated by an estimated tax reminder system for receiving a payment instruction from a taxpayer.

FIG. 6 depicts a screenshot of a webpage generated by an estimated tax reminder system for receiving a payment instruction from a taxpayer. As shown, the taxpayer can provide instructions for a payment to be made through a variety of methods including a credit card, an electronic finds transfer from a financial institution, or other online payment systems. The instructions may comprise credit card or bank account information and authorization. The taxpayer can specify current or schedule future payments. If delinquent in payments, the taxpayer may want to specify, for instance, that installment payments be made to the taxing authority in order to minimize accruing penalties.

A payment module 146 of the estimated tax reminder system 100 can carry out the instruction on behalf of the taxpayer. At the time instructed by the taxpayer, the payment module 146 initiates the transaction through the financial institution or service specified by the taxpayer. The payment module 146 communicates with a payment server 160 to verify information provided by the taxpayer and ensure that sufficient funds are available. The payment server 160 may comprise a credit card server, bank server, or other credit or financial server. If the information provided by the taxpayer is invalid, an error message is provided to the taxpayer. The payment may pass through a financial institution that in turn provides a consolidated payment to the various taxing authorities. Credit services may be offered through the estimated tax reminder system 100, for instance charging interest at a lower rate than the penalty charged by the estimated tax reminder system 100, and thereby allow a taxpayer to manage its payments without damaging her IRS record. The payment module 146 may also be used to make direct payments to taxing authorities. Based on the instructions provided, the estimated tax reminder system 100 may initiate a debit against a user's bank account to the taxing authority. The payment module 146 may receive feedback or other communication from a taxing authority on behalf of the taxpayer. In an embodiment, the estimated tax reminder system 100 automatically generates an email or other communication and provides it to the taxpayer.

If the taxpayer appears to fail to make a payment by a deadline, as gauged by the failure to make a payment through the estimated tax reminder system 100 or report that any payment has been made to satisfy an estimated tax obligation, the estimated tax reminder system 100 may generate and provide a message to the taxpayer, reminding him of his tax obligation and prompting him to change his status information if a payment has in fact been made. The estimated tax reminder system 100 may also calculate the estimated penalty associated with various periods of time based on information about the taxpayer such as an estimated tax obligation or information provided by the user. On a regular or periodic basis as specified by the tax preparer or taxpayer, a message including the penalty estimates may be provided to taxpayers that appear to be delinquent in their payments.

Estimated Tax Reminder System—Professional View

Figure 7A:
Figure 7B:
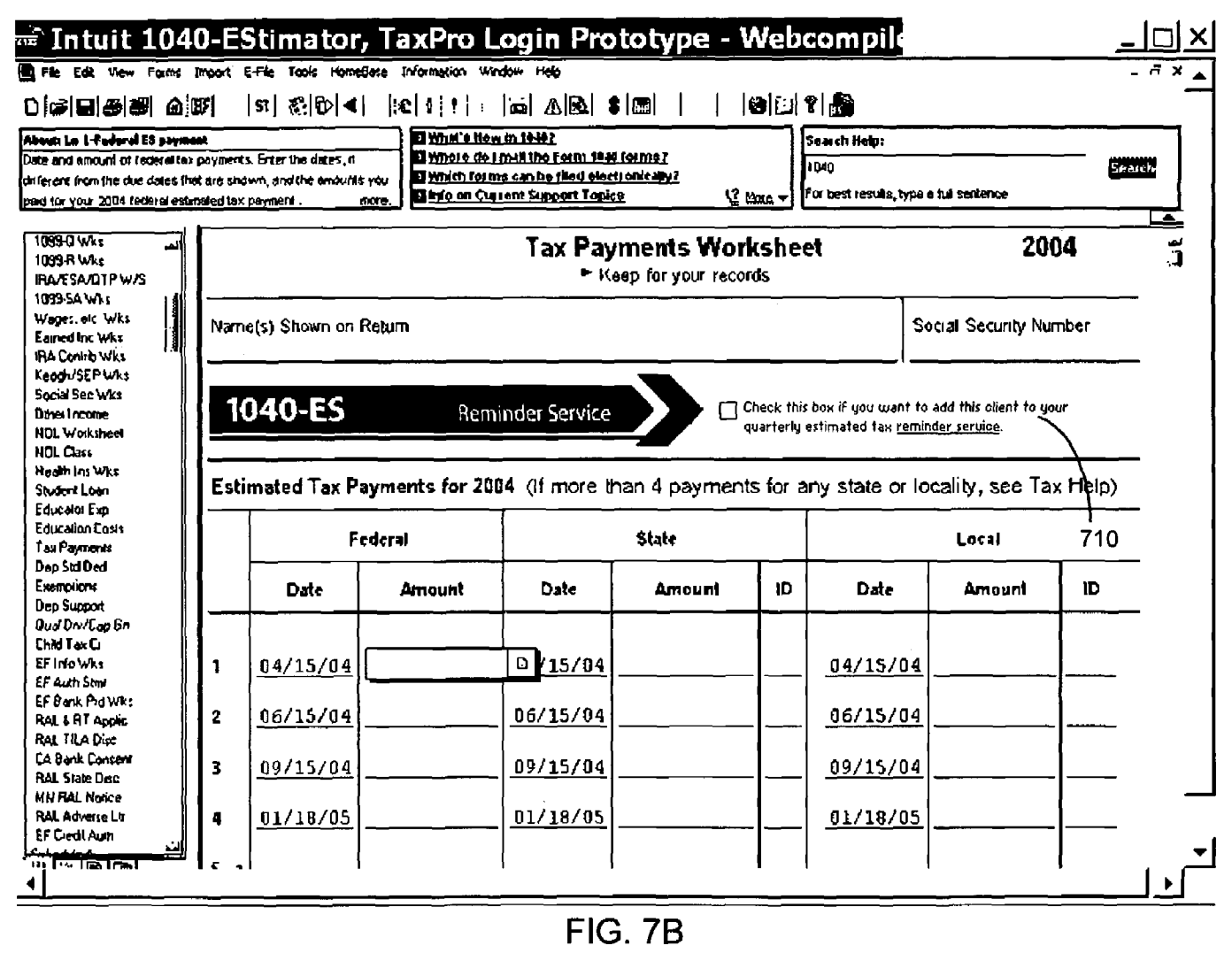

FIGS. 7A and 7B depict screenshots of interfaces integrated into various tax preparation applications for enlisting taxpayers to receive estimated tax reminders. As shown in FIG. 7A, a professional tax preparer can select an option of providing reminders to a taxpayer client by selecting a box 710 on an interface that is part of an estimated tax subsection of the tax preparation application. As shown in FIG. 7B, an estimated tax reminder service can be selected, using a box 710, in order to remind a taxpayer of federal, state, and local tax obligations. The schedule of the reminders is driven by the quarterly, biannual, or other deadlines set by each taxing authority.

Figure 8:
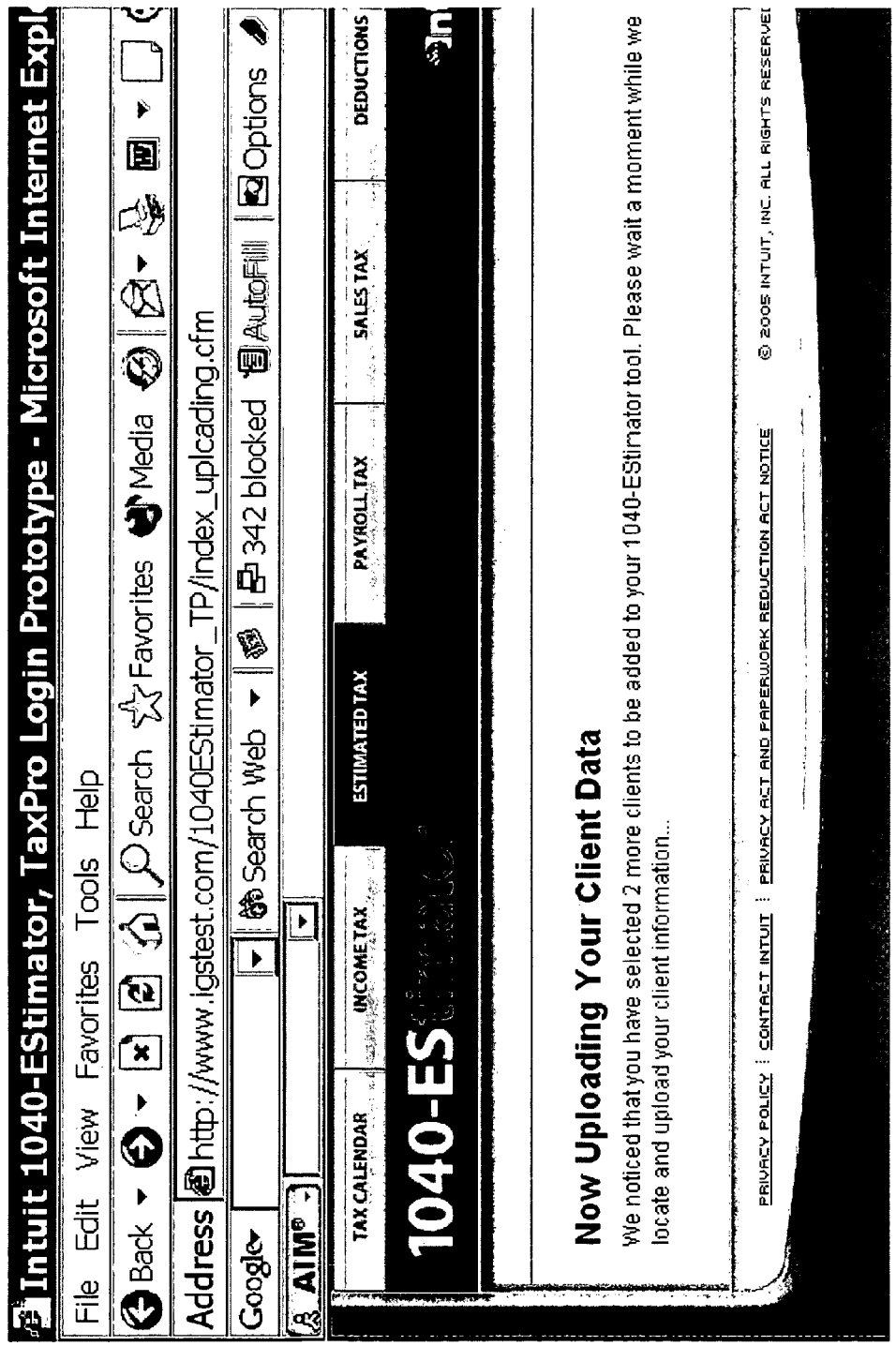
FIG. 8 depicts a screenshot of a webpage reflecting the importation of tax information data to an estimated tax reminder system.

Once a tax preparer has enrolled a taxpayer in the tax reminder service, the taxpayer's data is uploaded into the estimated tax reminder system 100. FIG. 8 depicts a screenshot of a webpage reflecting the importation of tax information data to an estimated tax reminder system. Where the estimated tax reminder system 100 is integrated into the application, the taxpayer's information may be imported, tagged, or otherwise designated "reminder service data." In another embodiment however, a tax record generated by a tax preparation application is provided to the estimated tax reminder system 100, which then parses the tax record for tax and other relevant information. The import module adds or simply designates the information in the database. Another option for adding a client or client information to the estimated tax reminder system 100 is for the tax preparer to manually add a client using interfaces such as those shown in FIGS. 9A and 9B. A taxpayer could also use such an interface to self-enroll. A tax preparer may use an alternative interface for simultaneously uploading information about a plurality of the tax preparer's clients. As shown, the interface of FIG. 9B solicits actual federal and state tax estimates 910 from the user. However, the tax preparer could also provide instructions about how a taxpayer's taxes should be calculated rather than an actual estimate—for instance specifying that tax estimates should be based on the previous year's income level. For self-enrolling taxpayers, the interface may solicit responses to questions such as whether the taxpayer expects her revenue and her expenses to go up, down, or stay the same. This information is used to determine the estimated tax amount.

FIG. 10 depicts a screenshot of a webpage generated by a tracking module of an estimated tax reminder system for viewing filing status and other information for the clients of a tax preparer. The webpage identifies each client by name and social security number, and includes information about the status of payments made by taxpayers in satisfaction of their tax obligations by reporting the advised tax obligation and actual payment amount for each client. The tracking page includes icons 1010 reflecting the status of email reminders— sent, not sent, or opened—sent to each taxpayer. Conventional or other methods may be used to track the status of email messages and/or whether or not a client has taken an action based on the email message. For instance, a message formatted in HTML for instance may include an executable script. The script specifies that a message or messages be sent to the estimated tax reminder system when the status of the message—received, opened, deleted—changes. A user can access the status information to ensure that the taxpayer has received and read the reminder. In addition, whether or not a taxpayer activates a link in the message can also tracked. For example, the link to a web server may include a client ID. When the taxpayer activates the link in the email, a browser application is invoked and contacts the web server, passing in the client ID. The tracking module can also track various other events such as whether or not the user has logged into the estimated tax reminder system 100 or whether there has been correspondence from a taxing authority to a taxpayer.

A tax preparer can use such an interface such as the one shown in FIG. 10 to specify that an action be taken based on the filing status of her clients. For instance, a tax preparer could specify that all of her clients with overdue payment obligations should receive a second reminder message. The reminder may include tax penalty information for various time periods. Such instructions and instructions about reminders, actions, and other aspects of the estimated tax reminder system may be provided to an administrative module. Through an interface, a user can specify, for instance, the form of payment reminders to be sent to taxpayers, the timing of the reminders, various payment options and methods for receiving payment instructions, tax professional contact information to be publicized, and available methods for carrying out payment instructions. A tax professional can customize the view his clients see, for instance designating an email address for tax related queries, creating or choosing among various message templates, and selecting various methods by which a taxpayer client can reach the professional. By selecting a link 1020 at the bottom of the interface of FIG. 10, a user can generate a report of tax activity for one or more taxpayers. This report can be provided to a client, tax preparer, or other user. Or, it can be provided to a tax application for integration of the information into a tax record for a taxpayer. Using this information, for instance, the tax application can calculate annual extension or catch-up payments.

Figure 12A:
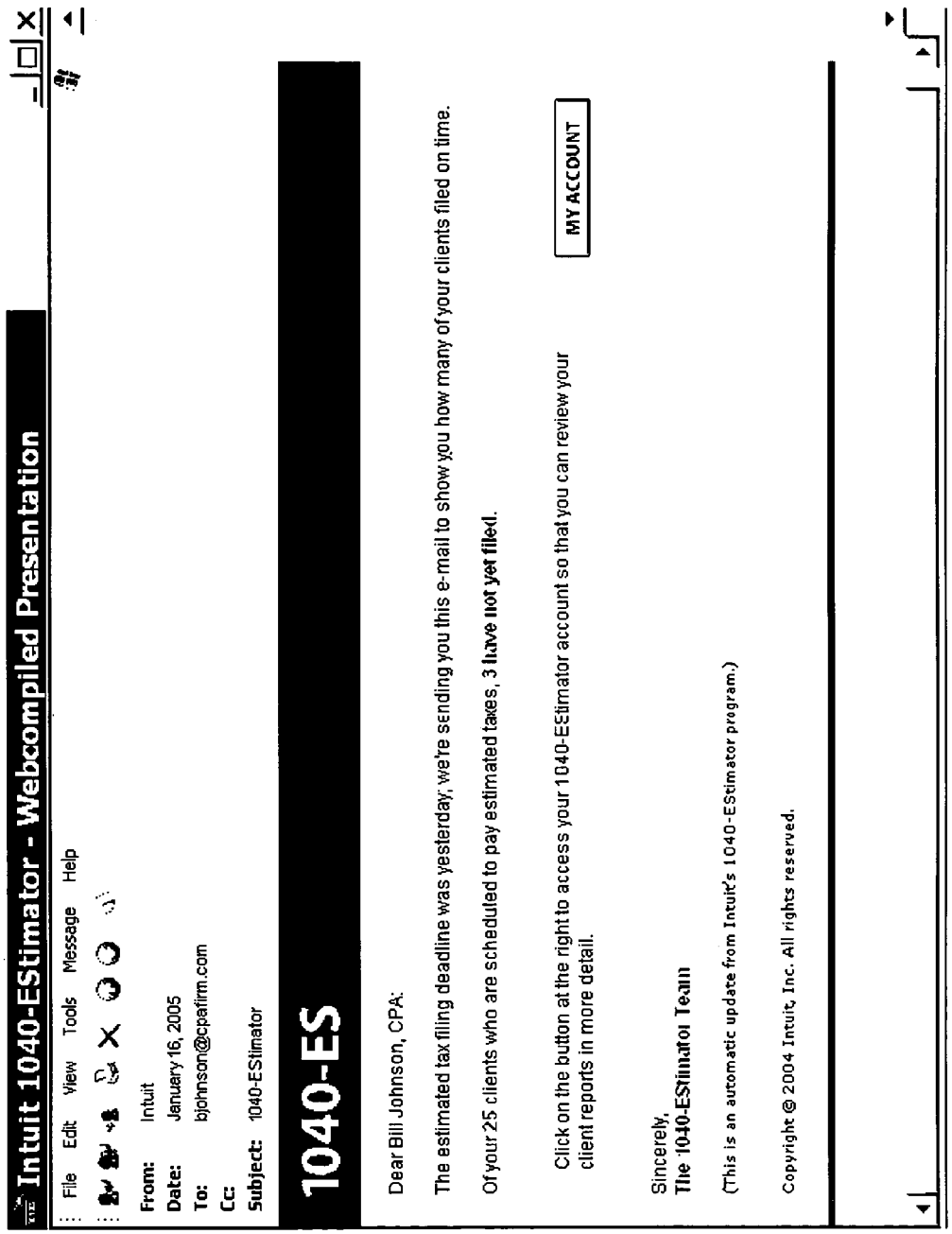
FIGS. 12A and 12B depict email reports generated by an estimated tax reminder system to be provided to a professional tax preparer.
Figure 12B:
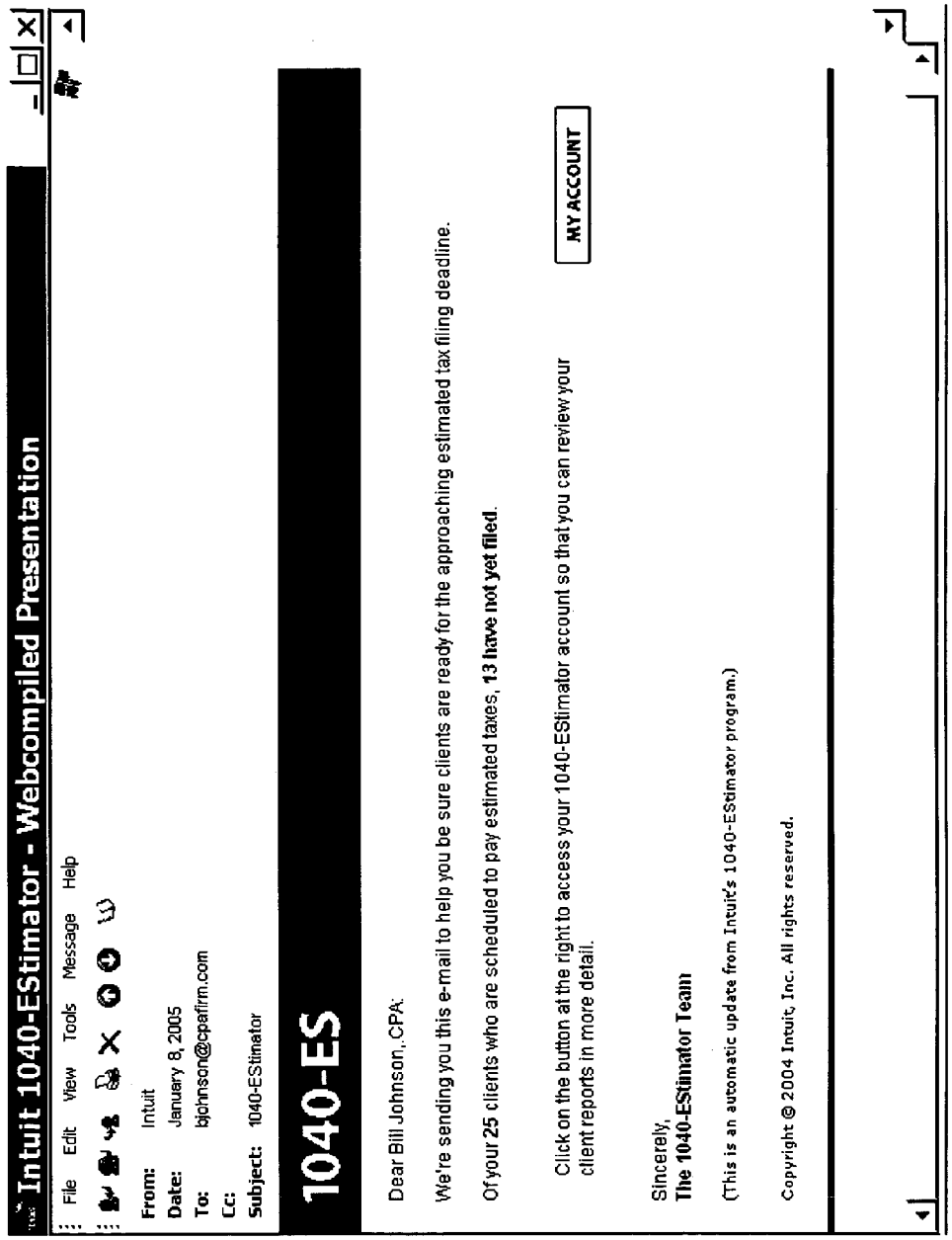

FIG. 11 depicts a screenshot of a webpage generated by an estimated tax reminder system for viewing filing status and payment history information for an individual taxpayer. The interface shows the payment history of the taxpayer for federal and state taxes and may reflect payments made through the estimated tax reminder system 100 and reported to, but made outside of, the estimated tax reminder system 100. It includes information about both quarterly payments and extension or catch-up payments, information about which may be provided by a tax application, a tax preparer, taxpayer, or other source. FIGS. 12A and 12B depict various email reports generated by the report module of an estimated tax reminder system to be provided to a professional tax preparer. The email reports are based on tracking information for the tax preparer's clients. FIG. 12A shows, for instance, that 13 out of 25 of the tax preparer's clients have not provided payments in accordance with estimated tax obligations. After a deadline has passed, a message such as that shown in FIG. 12B may be sent, indicating the number of people who have not filed. The report module may provide other types of information, output in various forms, including according to a user's preferences. The report module may, for instance, output the information in a spreadsheet or to a tax application with which the estimated tax reminder system is integrated.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

We claim:

1. A method for facilitating submission of an estimated periodic tax payment, comprising:
    receiving tax data about a taxpayer comprising contact information;
    receiving an instruction from the taxpayer for calculating an estimated periodic tax payment obligation (EPTPO) based on the taxpayer's income;
    determining, using a computer, the EPTPO of the taxpayer based on the tax data, the instruction from the taxpayer, and the taxpayer's income;
    generating, using the computer, a payment reminder for the taxpayer based on the EPTPO, wherein the payment reminder comprises a tax payment deadline, the EPTPO, and a link to an online payment system interface for receiving a payment instruction from the taxpayer for submitting an estimated tax payment to a taxing authority;
    electronically transmitting the payment reminder to the taxpayer before the tax payment deadline, based on the contact information;
    calculating, using the computer, an estimated penalty amount based on a period of time beyond a tax deadline, the EPTPO, and the tax data;
    displaying using the computer, the estimated penalty amount to the taxpayer;
    receiving the payment instruction from the taxpayer after displaying the estimated penalty amount; and
    submitting a payment to the tax authority according to the payment instruction of the taxpayer and after transmitting the payment reminder.

2. The method of claim 1, wherein the tax data is from the current year.

3. The method of claim 1, wherein the link refers to a website operated by a payment agent associated with the taxing authority.

4. The method of claim 1, wherein the payment instruction comprises periodically making the payment to the taxing authority.

5. A computer readable medium storing instructions for submission of estimated tax payments, the instructions executable on a processor and comprising functionality to:
    receive tax data about a taxpayer comprising contact information;
    receive an instruction from the taxpayer for calculating an estimated periodic tax payment obligation (EPTPO) based on the taxpayer's income;
    determine the EPTPO for the taxpayer based on the tax data, the instruction from the taxpayer and the taxpayer's income;
    generate a payment reminder for the taxpayer based on the EPTPO, wherein the payment reminder comprises a tax payment deadline, the EPTPO, and a link to an online payment system interface for receiving a payment instruction from the taxpayer for submitting an estimated tax payment to a taxing authority;
    transmit the payment reminder to the taxpayer before the tax payment deadline, according to a tax payment schedule;
    calculate an estimated penalty amount based on a period of time beyond a tax deadline, the EPTPO, and the tax data;
    display the estimated penalty amount to the taxpayer;
    receive the payment instruction from the taxpayer after displaying the estimated penalty amount;
    submit a payment to the tax authority according to the payment instruction of the taxpayer and after transmitting the payment reminder;
    receive payment status information for the taxpayer based on a tax payment; and
    provide an output to the user that includes payment status information for the taxpayer.

6. The computer readable medium of claim 5, the instructions further comprising functionality to:
    transmit a message after the tax payment deadline specifying that no tax payment has been made by the taxpayer, before submitting the payment.

7. The computer readable medium of claim 5, the instructions further comprising functionality to:
    generate a tracking interface; and
    providing a user instruction to take an action based on a filing status of the taxpayer.

8. The computer readable medium of claim 7, wherein the user instruction comprises sending a second reminder to a taxpayer including tax penalty information, wherein a payment status reflects that no tax payment has been made by the taxpayer.

9. The computer readable medium of claim 5, the instructions further comprising functionality to:
    receive a tax record generated by a tax preparation application for the taxpayer; and
    parse the tax record for the tax information.

10. A system for submission of estimated tax payments, comprising:
    a database configured to:
        contain a plurality of records, wherein each record specifies contact information and tax data of a taxpayer;
    a messaging module stored in hardware configured to:
        generate a payment reminder for the taxpayer based on an estimated periodic tax payment obligation (EPTPO), wherein the payment reminder comprises a tax payment deadline, the EPTPO, and a link to an online payment system interface for receiving a payment instruction from the taxpayer for submitting an estimated tax payment to a taxing authority;

electronically provide the reminder to the taxpayer before the tax payment deadline, based on the contact information; and display an estimated penalty amount to the taxpayer;

a submissions module stored in hardware configured to:
  receive an instruction from the taxpayer for calculating the EPTPO based on the taxpayer's income;
  determine the EPTPO of the taxpayer based on the tax data, the instruction from the taxpayer and the taxpayer's income;
  provide the EPTPO to the taxpayer;
  calculate the estimated penalty amount based on a period of time beyond a tax deadline, the EPTPO, and the tax data;
  receive the payment instruction from the taxpayer after displaying the estimated penalty amount; and
  receive payment status information for the taxpayer reflecting whether a payment has been made for the taxpayer responsive to the EPTPO; and a payment module stored in hardware configured to:
  submit a payment to the tax authority according to the payment instruction of the taxpayer after transmitting the payment reminder.

11. The system of claim 10, further comprising an import module configured to:
  receive a tax record for the taxpayer generated by a tax preparation application;
  extract tax information for the taxpayer from the tax record; and
  save the tax information to the database in one of the plurality of records for the taxpayer.

12. The system of claim 10, further comprising a tracking module configured to:
  provide tracking information for storage in the database, wherein the tracking information is based on a tax payment for the taxpayer that has been submitted to the tax authority.

13. The system of claim 10, further comprising a report module configured to:
  generate a report based on tracking information for the taxpayer, and
  provide the report to a tax preparation application.

14. The method of claim 1, wherein the payment instruction specifies making the payment by an electronic funds transfer.

15. The computer readable medium of claim 5, wherein the payment instruction specifies making the payment by an electronic funds transfer.

16. The system of claim 10, wherein the payment instruction specifies making the payment by an electronic funds transfer.

17. The method of claim 1, wherein the taxpayer's income is from a prior tax year.

18. The computer readable medium of claim 5, wherein the taxpayer's income is from a prior tax year.

19. The system of claim 10, wherein the taxpayer's income is from a prior tax year.

* * * * *

UNITED STATES PATENT AND TRADEMARK OFFICE
CERTIFICATE OF CORRECTION

| | | |
|---|---|---|
| PATENT NO. | : 7,716,094 B1 | Page 1 of 1 |
| APPLICATION NO. | : 11/123475 | |
| DATED | : May 11, 2010 | |
| INVENTOR(S) | : David Sutter et al. | |

It is certified that error appears in the above-identified patent and that said Letters Patent is hereby corrected as shown below:

On the Title Page Item (75) Inventors, Tod should read as "Todd";

In claim 1, column 11 (line 53), a comma should be placed after "displaying";

In claim 5, column 12 (line 10), a comma should be placed after "from the taxpayer";

In claim 10, column 13 (line 9), a comma should be placed after "from the taxpayer."

Signed and Sealed this

Seventeenth Day of August, 2010

David J. Kappos
*Director of the United States Patent and Trademark Office*